US010845969B2

(12) United States Patent
Elmieh et al.

(10) Patent No.: US 10,845,969 B2
(45) Date of Patent: *Nov. 24, 2020

(54) SYSTEM AND METHOD FOR NAVIGATING A FIELD OF VIEW WITHIN AN INTERACTIVE MEDIA-CONTENT ITEM

(71) Applicant: Google Technology Holdings LLC, Mountain View, CA (US)

(72) Inventors: Baback Elmieh, Palo Alto, CA (US); Brian M. Collins, South San Francisco, CA (US); Jan J. Pinkava, Portland, OR (US); Douglas Paul Sweetland, Los Angeles, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 317 days.

This patent is subject to a terminal disclaimer.

(21) Appl. No.: 15/943,453

(22) Filed: Apr. 2, 2018

(65) Prior Publication Data
US 2018/0225028 A1  Aug. 9, 2018

Related U.S. Application Data

(63) Continuation of application No. 14/209,432, filed on Mar. 13, 2014, now Pat. No. 9,933,921.

(Continued)

(51) Int. Cl.
*G06F 3/048* (2013.01)
*G06F 3/0484* (2013.01)
(Continued)

(52) U.S. Cl.
CPC .......... *G06F 3/04842* (2013.01); *A63F 13/00* (2013.01); *A63F 13/5258* (2014.09);
(Continued)

(58) Field of Classification Search
CPC ........ H04N 21/4728; H04N 21/21805; H04N 21/23412; H04N 21/4725; A63F 13/10;
(Continued)

(56) References Cited

U.S. PATENT DOCUMENTS 5,607,356 A   3/1997   Schwartz
5,892,507 A   4/1999   Moorby et al.
(Continued)

FOREIGN PATENT DOCUMENTS

EP       1087618       3/2001
EP       2209306       7/2010
WO       2006056311    6/2006

OTHER PUBLICATIONS

"Foreign Office Action", EP Application No. 14752459.9, dated Apr. 25, 2018, 6 pages.
(Continued)

*Primary Examiner* — Justin S Lee
(74) *Attorney, Agent, or Firm* — Colby Nipper PLLC

(57) ABSTRACT

A system and method for providing an interactive media content with explorable content on a computing device that includes rendering a field of view within a navigable media content item; rendering at least one targetable object within the media content item; through a user input mechanism, receiving a navigation command; navigating the field of view within the media based at least in part on the received user input mechanism; detecting a locking condition based, at least in part, on of the targetable object being in the field of view and entering a object-locked mode with the targetable object; and in the object-locked mode, automatically navigating the field of view to substantially track the targetable object of the object-locked mode.

20 Claims, 10 Drawing Sheets

Related U.S. Application Data

(60) Provisional application No. 61/778,841, filed on Mar. 13, 2013.

(51) Int. Cl.
| | | |
|---|---|---|
| *G06F 3/0481* | (2013.01) | |
| *A63F 13/00* | (2014.01) | |
| *G06F 3/01* | (2006.01) | |
| *G06F 3/0346* | (2013.01) | |
| *H04N 21/4725* | (2011.01) | |
| *A63F 13/5258* | (2014.01) | |
| *G06F 1/16* | (2006.01) | |

(52) U.S. Cl.
CPC ............ *G06F 1/1694* (2013.01); *G06F 3/017* (2013.01); *G06F 3/0346* (2013.01); *G06F 3/04815* (2013.01); *H04N 21/4725* (2013.01); *G06F 2200/1637* (2013.01)

(58) Field of Classification Search
CPC .... A63F 13/42; A63F 13/5372; A63F 13/837; G06F 16/583
See application file for complete search history.

(56) References Cited

U.S. PATENT DOCUMENTS

| | | |
|---|---|---|
| 6,621,504 B1 | 9/2003 | Nadas et al. |
| 6,714,909 B1 | 3/2004 | Gibbon et al. |
| 7,184,574 B1 | 2/2007 | Zahavi |
| 7,467,218 B2 | 12/2008 | Gould et al. |
| 7,860,309 B1 | 12/2010 | Bodnar et al. |
| 7,904,812 B2 | 3/2011 | Atlas et al. |
| 9,086,724 B2 | 7/2015 | Sakaguchi et al. |
| 9,087,403 B2 | 7/2015 | Keating et al. |
| 9,183,560 B2 | 11/2015 | Abelow |
| 9,589,597 B2 | 3/2017 | Austin et al. |
| 9,607,424 B2 | 3/2017 | Ng et al. |
| 9,766,786 B2 | 9/2017 | Elmieh et al. |
| 9,779,480 B2 | 10/2017 | Austin et al. |
| 9,851,868 B2 | 12/2017 | Elmieh |
| 9,933,921 B2 | 4/2018 | Elmieh et al. |
| 10,056,114 B2 | 8/2018 | Austin et al. |
| 2003/0145331 A1 | 7/2003 | Escobar et al. |
| 2003/0232318 A1 | 12/2003 | Altenhofen et al. |
| 2004/0021668 A1 | 2/2004 | Chevallier et al. |
| 2004/0218911 A1 | 11/2004 | Grimes |
| 2005/0025465 A1 | 2/2005 | Danieli |
| 2006/0256133 A1 | 11/2006 | Rosenberg |
| 2007/0028270 A1 | 2/2007 | Ostojic |
| 2007/0061862 A1 | 3/2007 | Berger et al. |
| 2008/0005669 A1 | 1/2008 | Eilertsen et al. |
| 2008/0034321 A1 | 2/2008 | Griffin |
| 2008/0215172 A1 | 9/2008 | Digon |
| 2008/0267451 A1 | 10/2008 | Karazi |
| 2009/0113278 A1 | 4/2009 | Denoue et al. |
| 2009/0181736 A1 | 7/2009 | Haigh-Hutchinson et al. |
| 2009/0198719 A1 | 8/2009 | DeWitt |
| 2009/0199090 A1 | 8/2009 | Poston et al. |
| 2009/0201313 A1 | 8/2009 | Thorn |
| 2009/0219411 A1 | 9/2009 | Marman et al. |
| 2009/0249404 A1 | 10/2009 | Chen |
| 2009/0325660 A1 | 12/2009 | Langridge |
| 2010/0115455 A1 | 5/2010 | Kim |
| 2010/0153520 A1 | 6/2010 | Daun et al. |
| 2010/0157064 A1 | 6/2010 | Cheng et al. |
| 2010/0174421 A1 | 7/2010 | Tsai et al. |
| 2010/0208138 A1 | 8/2010 | Mohri et al. |
| 2010/0251101 A1 | 9/2010 | Haussecker et al. |
| 2011/0126106 A1 | 5/2011 | Ben et al. |
| 2011/0258570 A1* | 10/2011 | Bucolo .................. G06Q 10/10 715/771 |
| 2011/0299832 A1 | 12/2011 | Butcher |
| 2011/0304627 A1 | 12/2011 | Kegel |
| 2012/0092348 A1 | 4/2012 | McCutchen |
| 2012/0105473 A1 | 5/2012 | Bar-Zeev et al. |
| 2012/0169882 A1 | 7/2012 | Millar et al. |
| 2012/0249424 A1 | 10/2012 | Bove et al. |
| 2013/0006897 A1* | 1/2013 | Jain ........................ G06N 5/022 706/12 |
| 2013/0073473 A1 | 3/2013 | Heath |
| 2014/0002580 A1 | 1/2014 | Bear et al. |
| 2014/0133834 A1 | 5/2014 | Shannon |
| 2014/0282013 A1 | 9/2014 | Amijee |
| 2015/0012827 A1 | 1/2015 | Elmeih |
| 2015/0022557 A1 | 1/2015 | Austin et al. |
| 2015/0023650 A1 | 1/2015 | Austin et al. |
| 2015/0026576 A1 | 1/2015 | Elmieh et al. |
| 2015/0042795 A1 | 2/2015 | Tsuria et al. |
| 2015/0378520 A1 | 12/2015 | Chandrasekaran |
| 2016/0026344 A1 | 1/2016 | Elmieh |
| 2016/0054863 A1 | 2/2016 | Elmieh et al. |

OTHER PUBLICATIONS

"Foreign Office Action", European Application No. 14747480.3, dated May 22, 2018, 5 pages.

"Notice of Allowance", U.S. Appl. No. 15/449,931, dated May 3, 2018, 5 pages.

"Foreign Office Action", European Application No. 14805391.1, dated Jul. 2, 2019, 16 pages.

"Advisory Action", U.S. Appl. No. 14/209,432, dated Sep. 8, 2017, 4 pages.

"Corrected Notice of Allowance", U.S. Appl. No. 14/335,821, dated Jan. 12, 2017, 2 pages.

"Final Office Action", U.S. Appl. No. 14/526,311, dated Sep. 22, 2017, 12 pages.

"Final Office Action", U.S. Appl. No. 14/513,761, dated May 3, 2017, 13 pages.

"Final Office Action", U.S. Appl. No. 14/333,387, dated Feb. 27, 2017, 16 pages.

"Final Office Action", U.S. Appl. No. 14/209,432, dated Jul. 7, 2016, 18 pages.

"Final Office Action", U.S. Appl. No. 14/209,432, dated Jun. 16, 2017, 23 pages.

"First Action Interview Office Action", U.S. Appl. No. 14/335,833, dated Mar. 6, 2017, 3 pages.

"First Action Interview Office Action", U.S. Appl. No. 14/526,311, dated Mar. 9, 2017, 3 pages.

"Foreign Office Action", EP Application No. 14805391.1, dated Dec. 19, 2017, 6 pages.

"Foreign Office Action", EP Application No. 14752459.9, dated Mar. 6, 2017, pp. 8.

"International Preliminary Report on Patentability", Application No. PCT/US2015/041339, dated Feb. 2, 2017, 10 pages.

"International Preliminary Report on Patentability", Application No. PCT/US2014/046907, dated Jan. 19, 2016, 8 pages.

"International Preliminary Report on Patentability", Application No. PCT/US20141047302, dated Jan. 19, 2016, 8 pages.

"International Preliminary Report on Patentability", Application No. PCT/US2014/047269, dated Jan. 19, 2016, 9 pages.

"International Search Report and Written Opinion", Application No. PCT/US2014/046907, dated Nov. 6, 2014, 11 Pages.

"International Search Report and Written Opinion", Application No. PCT/US2014/047269, dated Nov. 10, 2014, 13 pages.

"International Search Report and Written Opinion", Application No. PCT/US2014/047302, dated Jan. 22, 2015, 13 Pages.

"International Search Report and Written Opinion", Application No. PCT/US2015/041339, dated Oct. 30, 2015, 13 pages.

"Non-Final Office Action", U.S. Appl. No. 15/449,931, dated Dec. 18, 2017, 12 pages.

"Non-Final Office Action", U.S. Appl. No. 14/513,761, dated Oct. 4, 2016, 12 pages.

"Non-Final Office Action", U.S. Appl. No. 14/333,387, dated Jul. 28, 2016, 18 pages.

"Non-Final Office Action", U.S. Appl. No. 14/209,432, dated Mar. 10, 2016, 21 pages.

(56) References Cited

OTHER PUBLICATIONS

"Non-Final Office Action", U.S. Appl. No. 14/209,432, dated Dec. 7, 2016, 22 pages.
"Non-Final Office Action", U.S. Appl. No. 14/335,821, dated Feb. 25, 2016, 9 pages.
"Notice of Allowance", U.S. Appl. No. 14/513,761, dated Aug. 28, 2017, 5 pages.
"Notice of Allowance", U.S. Appl. No. 14/35,821, dated Oct. 25, 2016, 5 pages.
"Notice of Allowance", U.S. Appl. No. 14/335,833, dated May 24, 2017, 8 pages.
"Notice of Allowance", U.S. Appl. No. 14/209,432, dated Nov. 14, 2017, 9 pages.
"Notice of Allowance", U.S. Appl. No. 14/333,387, dated May 4, 2017, 9 pages.
"Pre-Interview Communication", U.S. Appl. No. 14/335,833, dated Dec. 29, 2016, 3 pages.
"Pre-Interview Communication", U.S. Appl. No. 14/526,311, dated Feb. 10, 2017, 7 pages.
"Restriction Requirement", U.S. Appl. No. 14/335,821, dated Nov. 4, 2015, 5 pages.
"SightLine: The Chair—Virtual Surreality", Retrieved from: http://sightlinevr.com/index.html on Nov. 30, 2015, 2 pages.
Heymann, S et al., "Representation, Coding and Interactive Rendering of High-Resolution Panoramic Images and Video Using MPEG-4", Panoramic Photogrammetry Workshop, Berlin, Germany, Feb. 28, 2005, 5 Pages.
Kwiatek, Karol "360degree Interactive Storytelling", University of Glasgow Retrieved from the Internet: URL:http://www.kwiatek.krakow.pl/publications/28128927_360storytelling_University_of_Glasgow_Karol_Kwiatek_PDF.pdf, Sep. 27, 2012, 80 Pages.
"Foreign Office Action", European Application No. 14747480.3, dated Jan. 25, 2019, 10 pages.

* cited by examiner

Possible event timeline based on locking on an object navigation commands pulled off
hat for 2s

SYSTEM AND METHOD FOR NAVIGATING A FIELD OF VIEW WITHIN AN INTERACTIVE MEDIA-CONTENT ITEM

CROSS-REFERENCE TO RELATED APPLICATIONS

This application is a continuation of U.S. patent application Ser. No. 14/209,432 filed Mar. 13, 2014 which in turn claims the benefit of U.S. Provisional Application Ser. No. 61/778,841, filed on Mar. 13, 2013, which is incorporated in its entirety by this reference.

TECHNICAL FIELD

This invention relates generally to the electronic media field, and more specifically to a new and useful system and method for navigating a field of view within an interactive media-content item in the electronic media field.

BACKGROUND

For much of history, media-content items (e.g., books, songs, and, more recently, movies and television programs) have been presented in a linear fashion with a fixed sequence of events. With linear content, the author specifies, with rigid control, what happens, when, to whom, and in what order.

Recently, some media-content items (e.g., interactive games) have progressed beyond linearity. Here, the author generally creates a framework for interaction, for example a three-dimensional "dungeon" or village, and populates it with possible characters and events. Individual users then freely (or, at least, seemingly freely) decide how they wish to navigate their ways through the framework. Their navigational and other choices determine, within limits set by the author, what actually happens within the framework and when. However, the interactive content items still adhere to constricted progression within the framework. Thus, there is a need in the electronic media field to create a new and useful system and method for navigating a field of view within an interactive media-content item. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1:
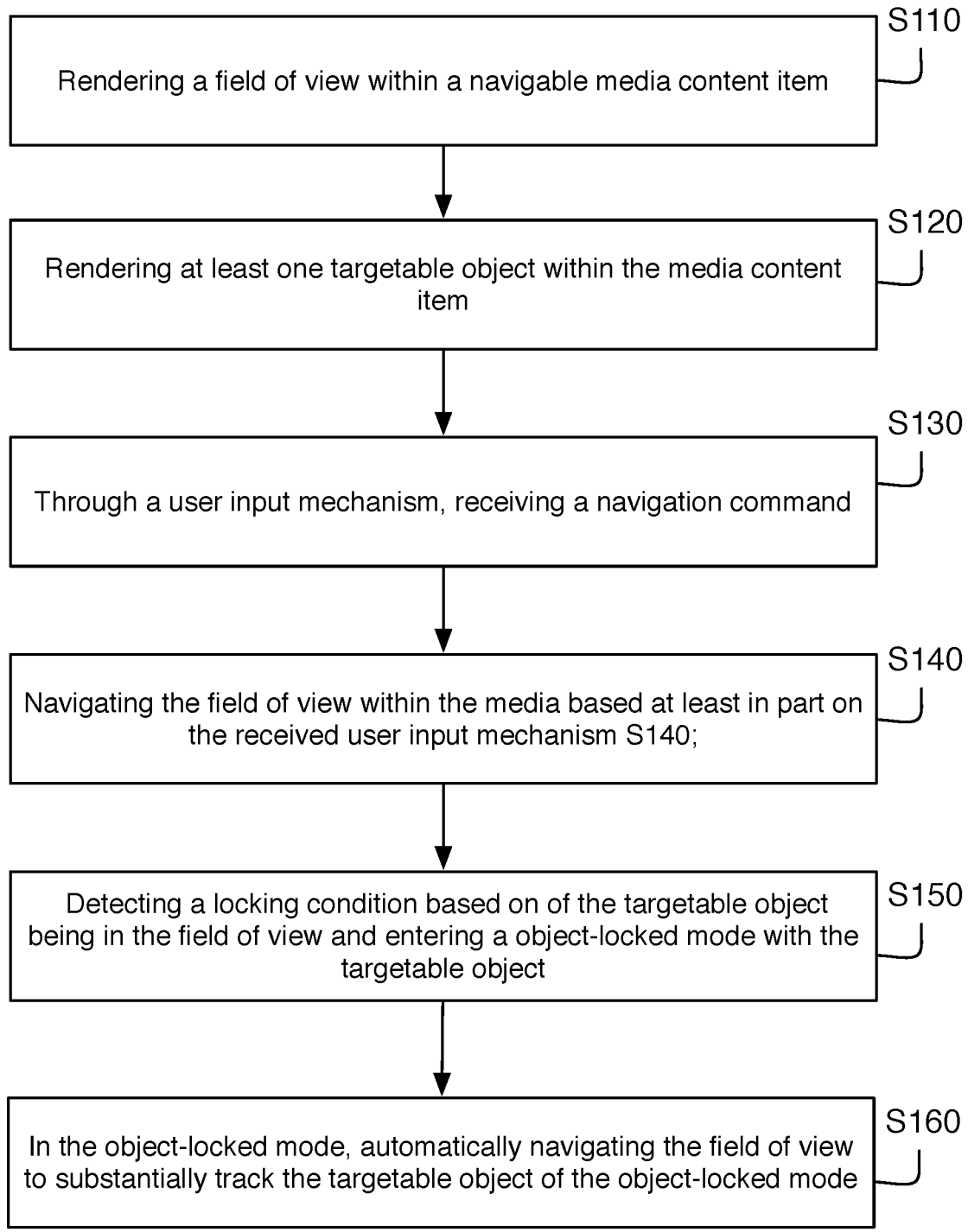
FIG. 1 is a flowchart representation of a method of a preferred embodiment.

As shown in FIG. 1, a method for navigating a field of view within an interactive media content item can include rendering a field of view within a navigable media content item S110; rendering at least one targetable object within the media content item S120; through a user input mechanism, receiving a navigation command S130; navigating the field of view within the media based at least in part on the received user input mechanism S140; detecting a locking condition based on of the targetable object being in the field of view and entering a object-locked mode with the targetable object S150; and in the object-locked mode, automatically navigating the field of view to substantially track the targetable object of the object-locked mode S160. The method functions to allow a user to explore and navigate within an interactive media-content item. The method can lock-on and unlock from various objects rendered within the media content to enable a user to more immersively engage with the media content. The media-content will preferably have multiple targetable objects with event timelines presented at different times and in response to different operating modes. The method is preferably operable on a personal device in response to user input delivered through the personal device, but the method may additionally be augmented through collective data obtained through media interactions of other user experiences (i.e., other instances of media interactions). The method is preferably used within story-based animations or real-life video based media. In one exemplary use, a short film could apply the interaction method to create a rich and engaging experience that multiplies the number of experiences proportional to the number of targetable objects, and can further be analytically updated according to object engagement.

Herein, examples are presented to illustrate applications of various mechanisms of the method used in interactive media-content. The interactive mechanisms can be applied in any suitable order or combination and with any suitable modification to create different effects. The method may be used within short films, long films, video games, TV programing, interactive educational lectures, or for any suitable purpose. Other content items, such as maps, games, and videos with more sophisticated story lines are possible. For example navigation and additional game/control mechanics can be added to allow interactions such as spatial three-dimensional navigation, zooming, and time navigation. For example, pushing the device 104 away might, for example, be interpreted as a "zoom out" command.

Block S110, which includes rendering a field of view within a navigable media content item, functions to display on a screen of the user's device one viewpoint of a scene of the media content item. The field of view is preferably rendered on a screen of the device. If the user's device is, for example, a set-top box, then it might not have a display integrated into it, and the displayed view is then on a device such as a television monitor or any suitable display controlled by the user's device. Rendering a field of view preferably includes displaying at least a portion of a visual scene of the media content item. Blocks S110 and S120 are preferably not a discrete processes. The field of view within the navigable media content and any targetable objects are continuously rendered for the duration of viewing/experiencing the media content item. The media content item can include media content of various mediums. Preferably, the media content item defines a sequencing of a visual representation. In one variation, the media content is a computer rendered three-dimensional environment (e.g., a virtual digital environment). The rendering of the three-dimensional environment can use any suitable computer graphics and/or animation techniques. Preferably, only a subset of the environment is rendered or at least presented at one time. The state of the scene and objects not displayed can be maintained and monitored. In another variation, the media content can include two-dimensional graphics mapped to a spherical, panoramic, or other suitable surface extending beyond the field of view. The two-dimensional graphics can be real-life video captured by a spherical camera, two-dimensional video stitched or combined to form a spherical video, a sequence of animation layers or stills rendered as animated video on a spherical surface. A user preferably explores the spherical surface by directing the computing device in different directions to simulate the computing device providing a point of view into a world. Any suitable, form of media rendering may alternatively be used. The media content may not even be limited to visual representation, but may be audio rendering. In one alternative embodiment, the user can lock onto and off of different audio targetable objects (e.g., different speakers) using 3D, binaural, or otherwise immersive audio experiences.

Figure 2:
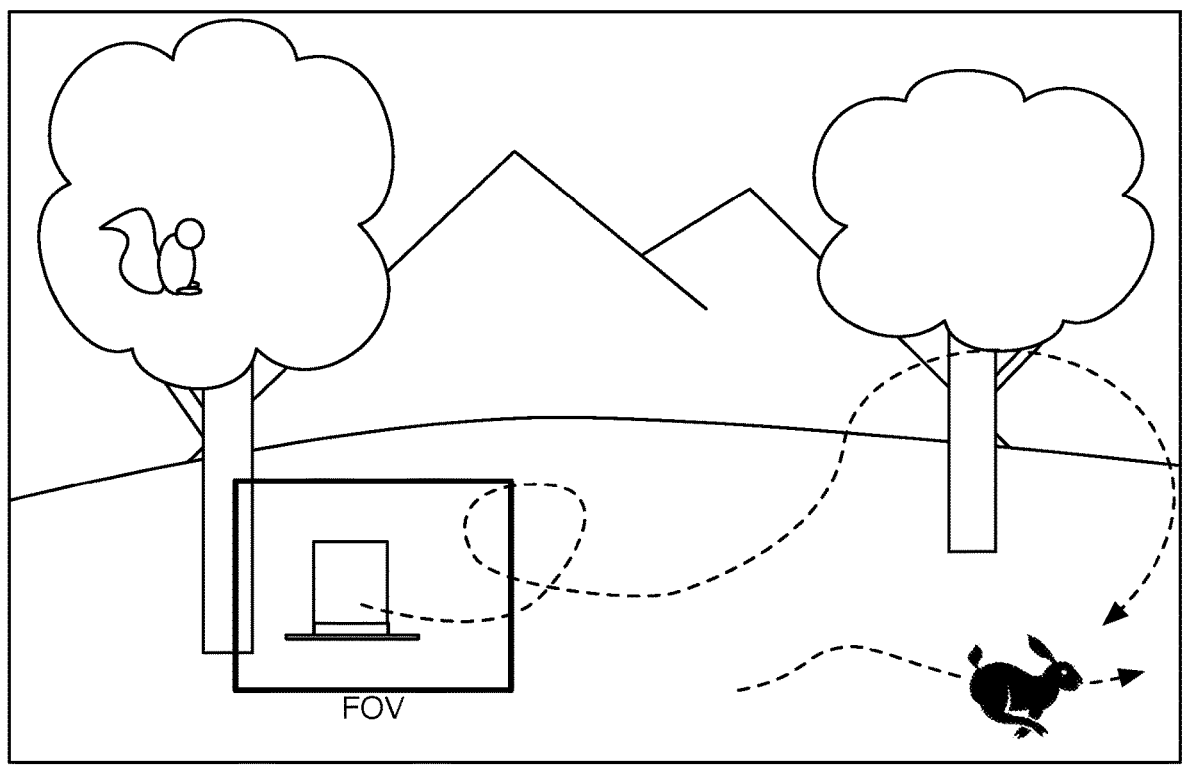
FIG. 2 is a schematic representation of an exemplary media content item scene with a represented field of view of a device.

The field of view is preferably the area associated with the viewpoint presented to the user within a display as shown in FIG. 2. The field of view preferably has a focus, which can be defined as the center of the field of view, the in-focus object. The camera position (i.e., view origin point) can additionally be fixed to a single point, but the camera position may additionally be changed through navigation commands (e.g., walking forward), defined through camera controller (e.g., cinematic direction to automatically position the camera position at least partially independent of the field of view), or set in any suitable manner. The field of view is preferably defined within a view box having a fixed size and or ratio of width and height. The field of view may additionally include zoom levels and other suitable aspects defining elements of the rendered media content at any particular point.

Block S120, which includes rendering at least one targetable object within the media content item, functions to present or display at least at some point during the rendering of the media content item an object attached to some narrative timeline. The media content item preferably includes targetable objects and non-targetable objects. Targetable objects are preferably characters, props, environments, or other elements with which events and narrative elements revolve. The media content item preferably has multiple storylines (i.e., event timelines) that can be played, triggered, or manipulated in any suitable manner. The storylines of multiple targetable objects can intersect and impact each other. In one preferred variation, the event timeline of a particular targetable object proceeds when in an object-locked mode (i.e., the field of view is locked on that particular targetable object). The timeline can stop or proceed to the next pause point when not the focus of an object-locked mode. This scenario describes an asynchronous event timeline of a targetable object, where the storyline revolving around the object progresses depending on the state of the object-locked mode. One use of the asynchronous event timelines is that user selection between two or more optional storylines may be performed based on which object enters an object-locked mode. In another variation, a targetable object can be managed and rendered according to a synchronous event timeline. A synchronous event timeline will result in the storyline of a targetable object (and related scene elements) to progress independently of the field of view and/or the object-locked mode. One use of a synchronous timeline is that events do not wait on the user input, and may be missed if the user does not navigate in time to view the events. The progression of events for a targetable object can be configured in any suitable manner. Preferably, a media content item can switch between asynchronous modes, synchronous modes, and any suitable mode.

In one variation, the targetable objects can have different associated parameters that can alter the object locking and unlocking experience. For example, a high profile object (e.g., a main character in a media content item) may have a low threshold of locking on and a higher threshold to unlocking. While a lower priority object (e.g., a side character with a storyline parallel to the main storyline), may have a higher threshold of locking on and a lower threshold to unlocking.

Targetable objects can additionally be grouped or split at different times. For example, a first targetable object may include, produce, or introduce multiple targetable objects at a subsequent time. Similarly, targetable objects may join other targetable objects at a subsequent time.

In one example media content item, the story of several woodland animals can revolve around the discovery of an object such as a hat as shown in FIG. 2. The hat, a rabbit, and squirrel may all be targetable objects when they appear. The targetable objects can have storylines that extend through the entire timeline of the media content items or for only a portion of the full timeline. Other elements such as the whole forest scene, trees, grass, flowers, side character (e.g., birds), may be animated, dynamic, and partially interactive, but may not be targetable wherein they can trigger object-locked mode. The author of this media-content item may have marked the rabbit as a "targetable" object. By so marking the rabbit, the author indicates that the rabbit 302 is worth following, possibly to develop a story line intended by the author. Herein, the hat in the forest example will be referenced for illustrative purposes, but any suitable story or interactive experience may alternatively be used.

The marking, selecting, or setting of a targetable object is preferably unbeknownst to the user. The objects preferably appear unidentified in the field of view of the user, which functions to encourage a user to interact and explore the media to discover different targetable objects. If the media-content item is meant for very young users, then the navigation can be eased by visually highlighting the targetable objects to make them more apparent. For some media-content items, the user 102 can himself select an object, mark it as targetable, and lock onto it. This can be useful, for example, when the media-content item is a virtual reality viewpoint overlaid onto a view into reality, and the user wishes to track a real-life object. Because the provider of this media-content item cannot predict what objects will appear, it could not mark all the potentially interesting ones as targetable.

Figure 3A:
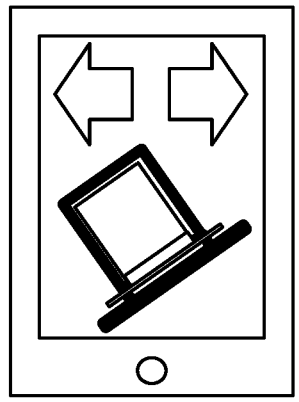
FIGS. 3A and 3B are two exemplary schematic representations of receiving navigation input.
Figure 3B:
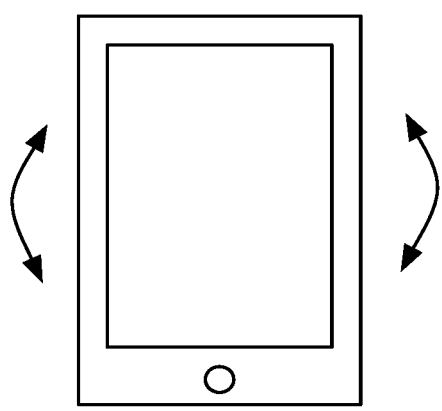

Block S130, which includes receiving a navigation command, functions to obtain direction from a user or some alternative input in terms of how to alter the field of view of the media content item. As described above, the field of view of the content item preferably presents only a subset of the environment of the media content item. The user can preferably navigate, at least to a limited extent, within the interactive media-content item. The navigation on a simplistic implementation may control of the field of view along one dimension of freedom (e.g., right or left) as shown in FIG. 3A. More complex inputs can allow for directing the field of view to substantially viewpoint of a spherical environment; for positioning the camera in six degrees of motion (e.g., moving the camera viewpoint in three dimensional space while orienting it in any suitable direction) as shown in FIG. 3B. Any suitable form of input may be afforded to the user. While traditional input devices (e.g., a keyboard or mouse) could be used, many modern portable communications devices support a much more compelling navigational modality: These devices can sense how they are moved through space. Thus, to navigate to the right, the user may simply hold the device in front of him and then move the device to his right. The device may sense this movement using an internal motion unit, accelerometers, gyroscopes, magnetometers, tilt sensors, visual or spatial sensing units, GPS, positional sensors, or any suitable sensor. This movement input is preferably reported to a controller and used in rendering the media content item.

Block S140, which includes navigating the field of view within the media based at least in part on the received user input mechanism, functions to apply navigational input of a user to orienting the field of view. The field of view is preferably changed in response to the provided navigational controls provided to a user. This is preferably one mode in which the field of view is changed. The field of view may additionally change in response to being in an object-locked mode or in response to pre-defined camera controls. The user preferably retains at least partial control of the field of view for the duration of the media content item, but some portions may have fixed camera orientation, where the navigation is not responsive to navigation commands. The navigation commands preferably have a configured response function that defines how the navigation commands impact changes in the navigation of the field of view. As described below, the respond function of the navigation commands can be augmented depending on the operating mode. In an unlocked mode, the navigation commands preferably impact navigation according to a default response function. In a locked mode, the response function is actively biased towards the object targeted in the object-locked mode. When biasing navigating the field of view, the automatic tracking is promoted through altering the controls. For example, if the user is locked on to the hat, the user may have to apply proportionally more input to move change the field of view (before unlocking from the object), and if no input is applied, the bias results in automatic tracking. In effect, the field of view feels a pull toward the locked object.

Block S150, which includes detecting a locking condition based on of the targetable object being in the field of view and entering a object-locked mode with the targetable object, functions to identify when to lock onto a targetable object. The field of view is preferably interpreted as a signal of the interest of the user. Eye tracking, cursor tracking, or other scene directed identifiers can provide an additional or alternative mechanism to determine user interest. A locking condition is preferably any suitable condition relating to the field of view and at least some element of the field of view. The locking condition can depend on time, focus (e.g., distance from center of the field of view), user history, collective input of multiple users, user input, zooming, panning, and/or any suitable signal. As mentioned above, the locking condition can depend on the priority of the targetable object. The locking condition may additionally depend on the current operating condition. For example, the locking condition may be different if the user is locked onto another object and is trying to transition to a new object.

Figure 4:
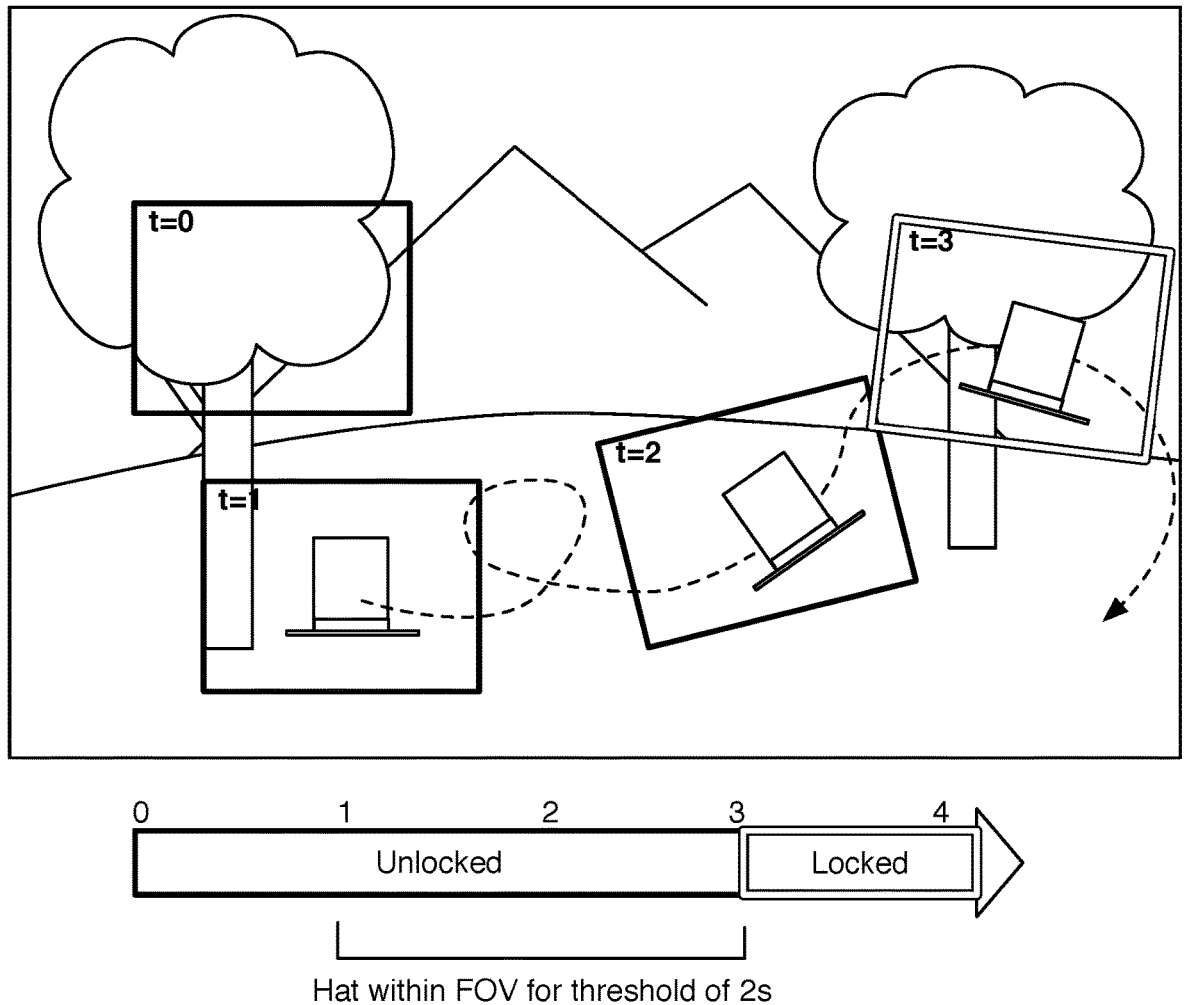
FIG. 4 is a schematic representation of entering an object-locked mode.
Figure 5:
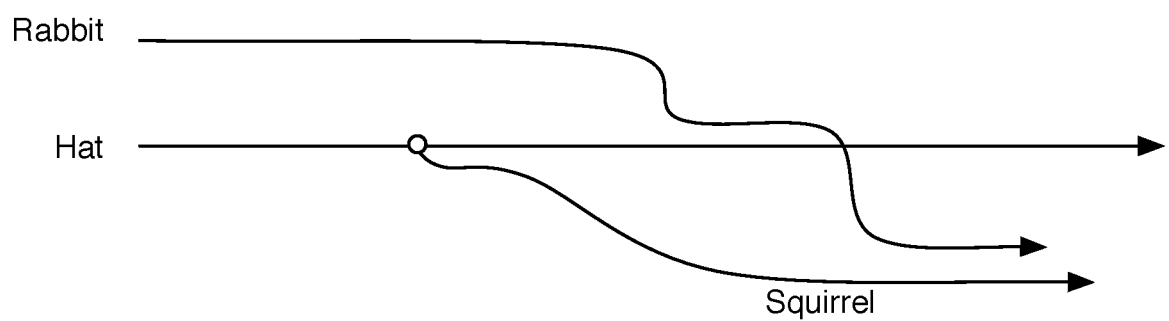
FIG. 5 is a schematic representation of event timelines of multiple targetable objects that are altered according to the object-locked mode.

In one variation, block S150 can include detecting the targetable object maintained in the field of view for a threshold amount of time in response to navigation commands as shown in FIG. 4. Preferably, if the user navigates so as to keep a targetable object within his field of view for a threshold amount of time, then the application rendering the media-content item enters the "locked" navigation mode. For example, if the hat in the exemplary forest scene may be blown around along a turbulent path; if the user keeps the hat within the field of view for some threshold of time then the viewing of the hat may satisfy a locking condition to trigger locking on to the hat. In one variation, the threshold of time may be a set time that the hat is kept within some distance of the center of the field of view. In another variation, the threshold of time may be the hat being contained in the field of view for some percentage of a set amount of time (e.g., in the field of view for 80% of the last 5 seconds). As an example of object prioritization, a side character mouse may require 8 seconds to satisfy a locking condition. Other locking conditions may alternatively be used. In one variation, there may be multiple locking conditions that if satisfied will trigger locking on to an object. In one variation, detecting user selection input of a targetable object can be a locking condition, which functions to provide an explicit option for selecting an object.

In one variation, the navigation of the field of view by the user is used in combination with the collective navigation of the field of view by additional users. In one variation, multiple users may be viewing the same media content item simultaneously, and a plurality of users can provide at least partial navigation input. In one variation, this navigation input could be eye tracking. In another variation, multiple users may have previously experienced the media content item. Information about what and when objects were locked can be monitored and used as a factor in determining the locking condition. For example, the threshold for locking onto an object may be lowered if that object is locked onto by a higher proportion of users (indicating the object is interesting). In one variation, the collective navigation of additional users may be information embedded in a shared link or communicated during sharing of the media content item. In this way, a first user may experience the media content item with some history of what objects were locked and when; then after the first user shares the media content with a friend, that friend may be passively encouraged to follow a similar experience because of modification of the locking conditions. Promotion of shared experiences of multi-timeline media content can additionally be achieved through biasing of navigation input in a manner similar to when in a locked mode (e.g., the unlocked mode is biased towards suggested, recommended, or pre-selected targetable objects).

As mentioned above, an interactive media-content item could include a number of targetable items, and a number of them could be visible at the same time within the field of view. Because, generally speaking, multiple targetable objects cannot all be followed at the same time, a methodology can be enforced to eliminate confusion. For example, if there are multiple targetable objects in view when entering the locked navigation mode, then the navigation locks onto that targetable object that has been in view the longest. Alternatively, the priority of the different objects may be used. In another variation, the history of the user can be applied. For example, a heuristic can be used to promote exploring different timelines. So if there are two targetable objects in the field of view, and a first object was locked-on in a past viewing of the media content item, then the second object is locked onto in place of the first object.

Block S160, which includes, in the object-locked mode, automatically navigating the field of view to substantially track the targetable object of the object-locked mode S160, functions to guide navigation to promote following the event timeline of the targetable object. While in the object-locked mode, the navigation is locked onto the targetable object. In one variation, the application takes over navigation from the user to automatically keep the targetable object within the user's viewpoint. In short, even though the user stops entering navigation commands, his viewpoint will still follow the hat. With the navigation mode locked onto the hat, the field of view automatically moves, following the hat and keeping it in view. More preferably, the automatically navigating the field of view includes maintaining the targetable object within the field of view until receiving a navigation command satisfying an unlocking threshold. Users are preferably not prevented from inputting navigation commands, but the navigation commands can be altered to prevent unintentional unlocking. As described more below, the user can "unlock" navigation at any time by entering a navigational command that exceeds a threshold. The threshold is established so that unintended "jiggling" of the device does not inadvertently unlock navigation. Instead, if the user enters a determined navigational command, then navigation is unlocked and the navigation command is performed.

Alternatively, automatically navigating the field of view can include biasing navigation commands response to user input, which functions to set the input mechanism to default to tracking the targeted object. The navigation commands response to user input is preferably biased with a dynamic bias that promotes tracking the targetable object. Tracking the object preferably maintains the targetable object within the field of view or at least returns the object to a field of view within a reasonable timespan. The bias can be represented in the rendered field of view as a gradual animation to center on the targetable object if there is no input. The bias preferably allows a user to still explore the environment to some extent but not unlock from the object. The bias preferably manifests itself into a "gravitational pull to the targeted object until the field of view is unlocked from the object. The bias is preferably dynamic in the sense that the mapping between input and navigational response can be updated based on the position of the targetable object.

Additionally, the method can include, when in an object-locked mode, altering the event timeline of the targetable object in the media content according to the object-locked mode S170. In one application, events and interactions are initiated or triggered when entering an object-locked mode of a targetable object. For example, the hat may be lying on the ground initially before entering an object-locked mode. When the navigation enters an object-locked mode focused on the hat, a gust of wind may pick it up and carry it around the forest. Additionally, if the navigation unlocks from the object, then the event timeline of that object may pause, transition to a different event timeline (e.g., the had falls to ground), or alternatively continue. Such event timeline responses can preferably be set by the creator of media content item and can be used to create synchronous, asynchronous, and hybrid timelines of objects.

Figure 6:
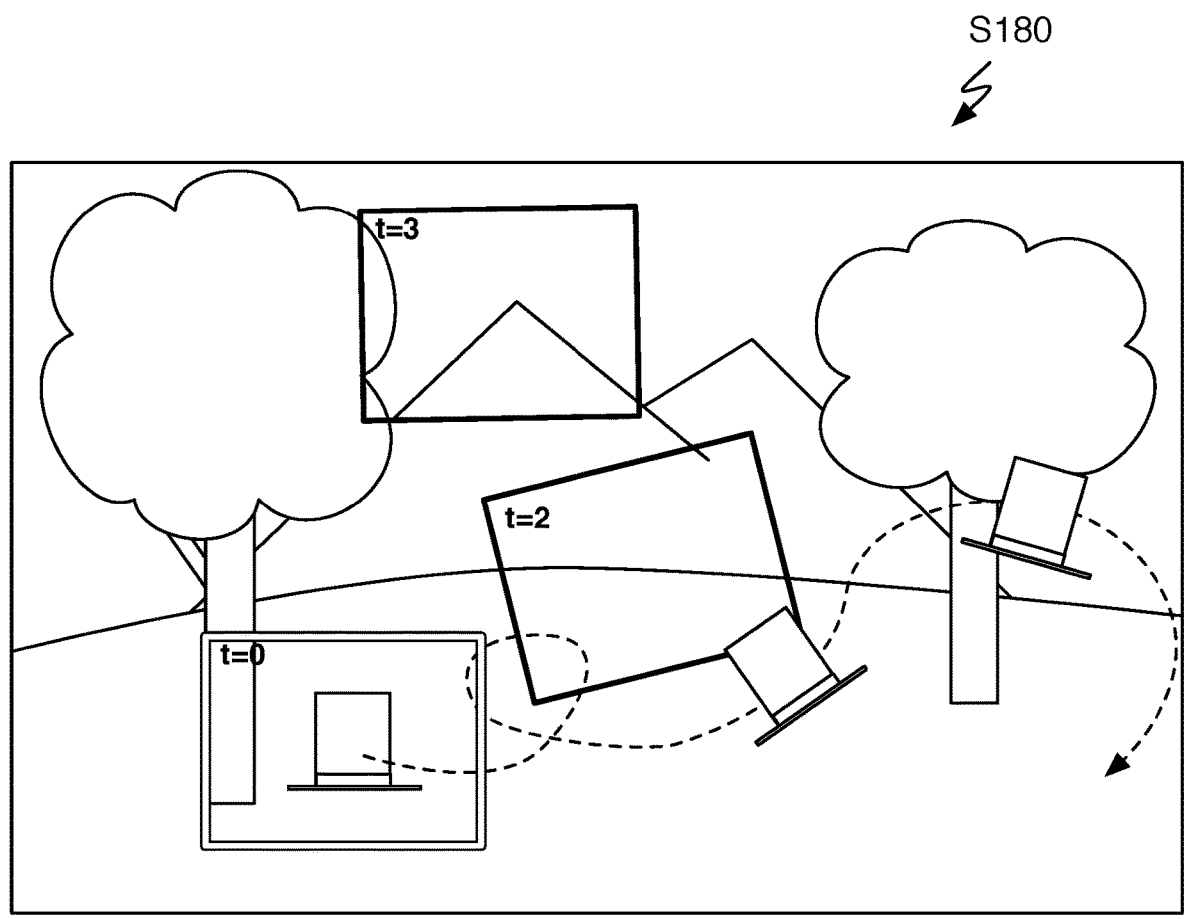
FIG. 6 is a schematic representation of entering an unlocked mode.
Figure 6:
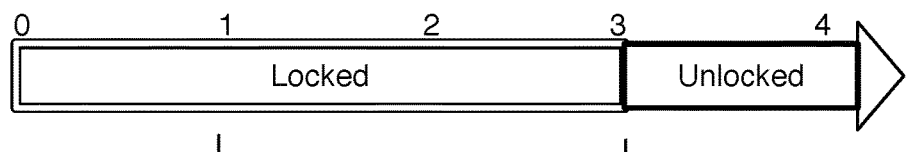

As shown in FIG. 6, the method can additionally include receiving a navigation command satisfying an unlocking threshold and disengaging an object-locked mode of the targeted object S180. The unlocking threshold is preferably a condition based on, at least in part, on the navigation commands of the user input. The object-locked mode is preferably disengaged if and when the unlocking threshold is satisfied. The unlocking condition, in a similar manner as the locking condition, can depend on time, focus (e.g., distance of the targetable object from the center of the field of view), user history, collective input of multiple users, user input, zooming, panning, and/or any suitable signal. In one exemplary implementation, the unlocking condition is satisfied when the targetable object is out of the focus of the field of view (e.g., out of the field of view or out center) in response to user input for a set amount of time. In another variation, the unlocking condition is anytime user input is received with a magnitude above a minimum level. The minimum level is preferably a magnitude to allow for "jiggle" or accidental input.

In one variation, disengaging an object-locked mode of the targeted object includes entering an unlocked mode and when in an unlocked mode navigating according to user input. The unlocking process preferably functions to re-enable the normal mode of navigation (e.g., a free view).

Figure 7:
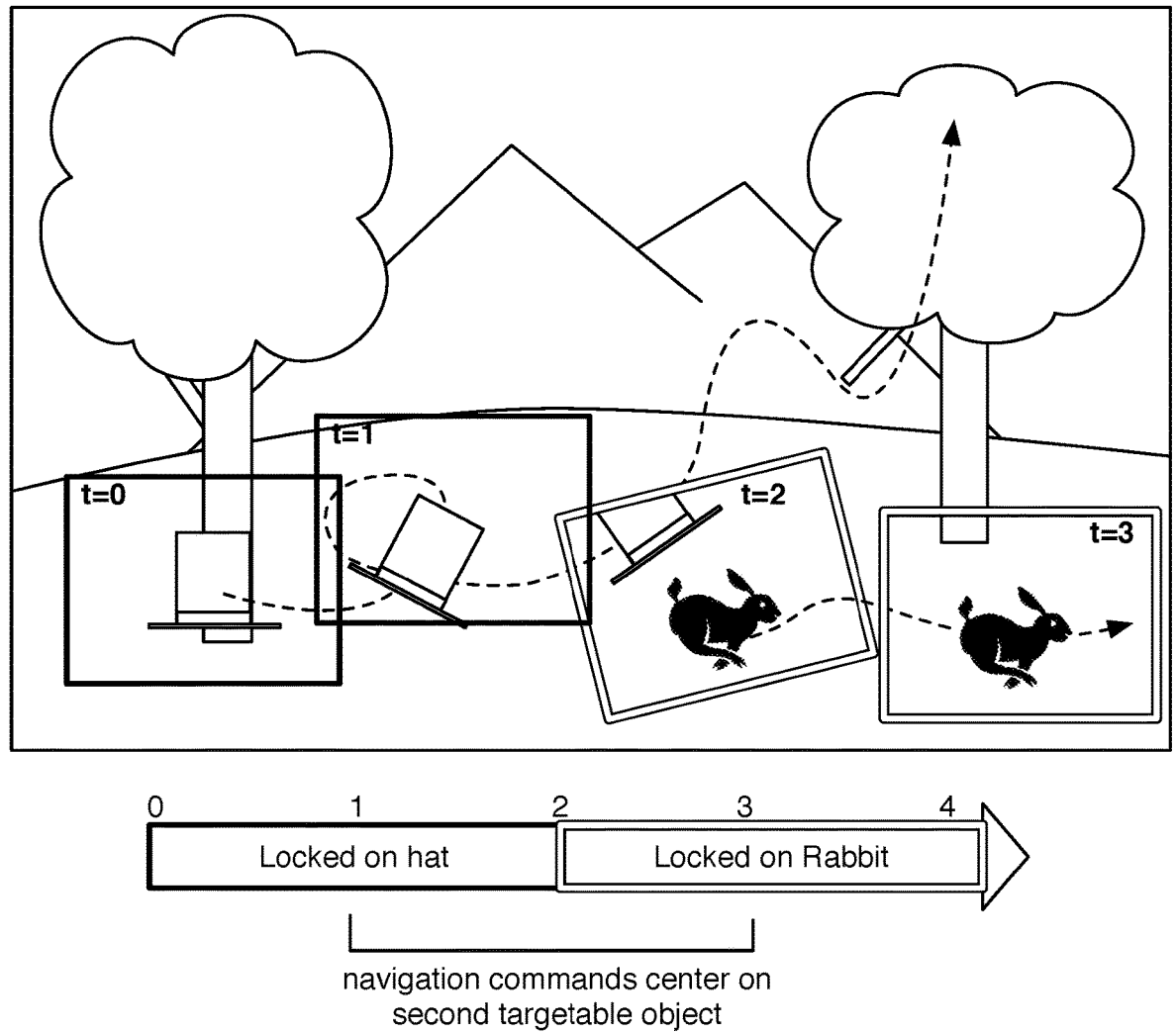
FIG. 7 is a schematic representation of transitioning to locking onto a second targetable object.

In another variation, disengaging an object-locked mode of the targeted object includes entering an object-locked mode with a second targetable object, which functions to transition from tracking a first object to a second object as shown in FIG. 7. This variation results in the navigation mode remaining in the object-locked mode, but switching focus to a new object. During the duration of a media content item, a user preferably will transition between multiple targetable objects: sometimes returning to previously tracked objects; sometimes pausing to explore before re-engaging the same or a different object; sometimes seamlessly transitioning from tracking of a first object to tracking of a second object; or performing any suitable sequence of locking and unlocking.

Figure 8:
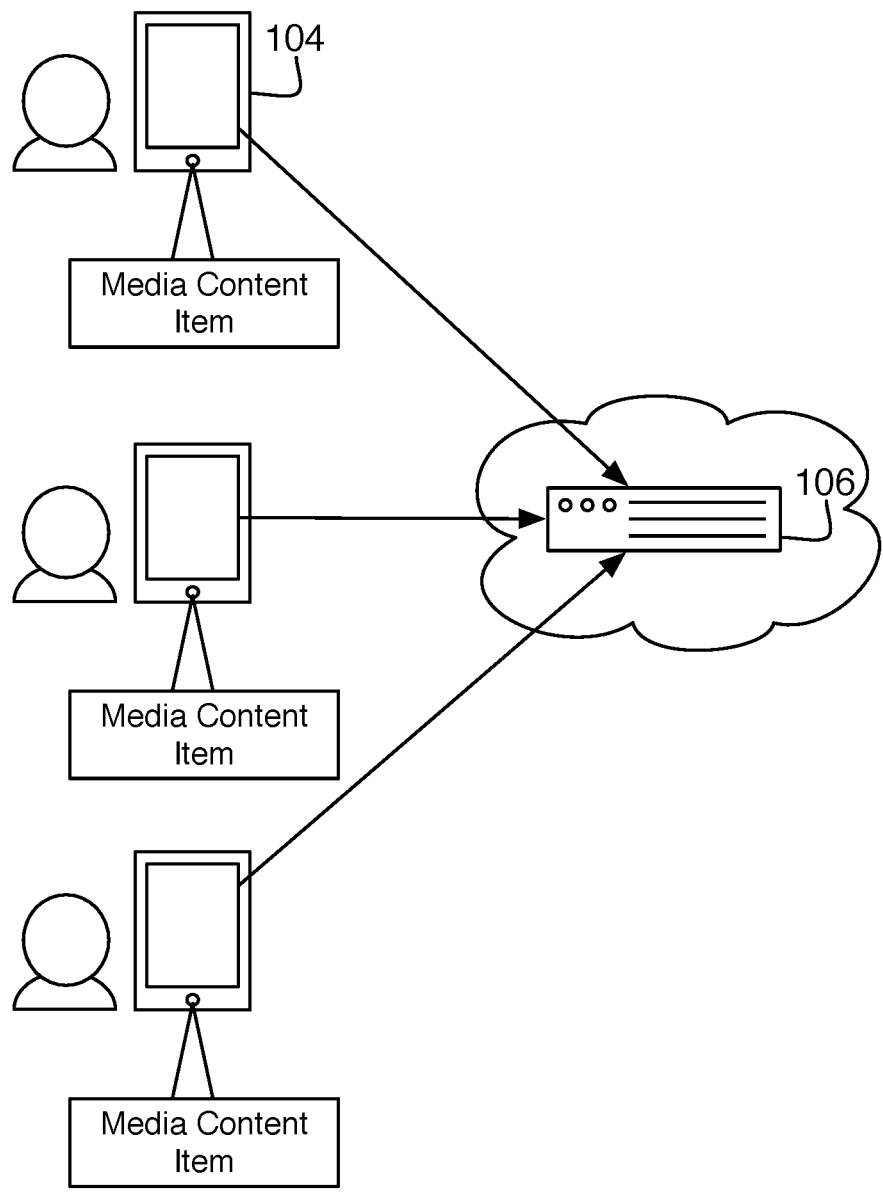
FIG. 8 is a schematic representation of transmitting target locking information.

Additionally, the method can include transmitting to a remote server target locking information within the media content S190, which functions to collect analytics from multiple instances of a media content item as shown in FIG. 8. The media content item is preferably distributed for use by multiple users, and the collective usage and target locking information centralized for use by the author or provider of the media content item. The remote server is preferably any suitable analytics system preferably accessed over the internet or through any suitable protocol. The tracking locking information can include what objects are tracked, the timing and properties of when locking on an object, what objects are not tracked, timing and properties of when unlocking, and/or any suitable data relating to interactions with the media content item. The author or provider can use this information to determine, for example, whether or not the hat in the example above is a compelling image and can modify the media-content item accordingly.

Figure 9:
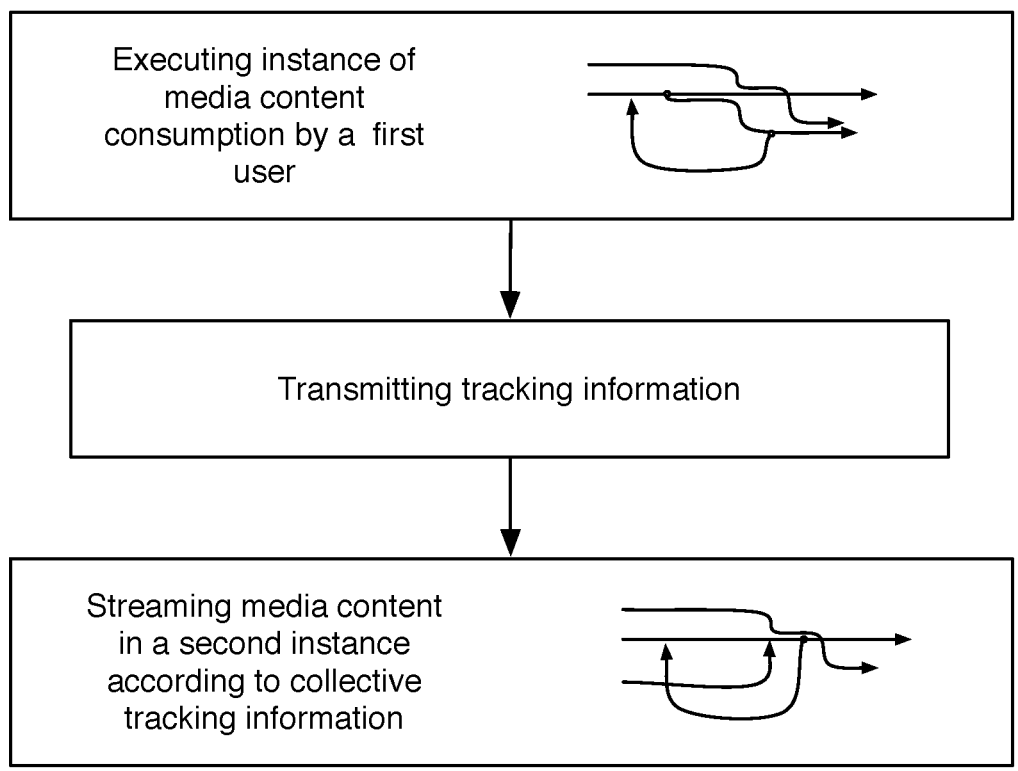
FIG. 9 is a flowchart representation of streaming augmented targetable objects.

In one variation, all or a portion of the media content item can be downloaded to the rendering device. In one variation, the media can be streamed in real time. Used in combination with the collection of target locking information, the media content item can be updated to alter targetable objects as shown in FIG. 9. As one exemplary use, if users are not responding to a particular targetable object, the representation of the targetable object or the storyline of the targetable object can be updated. For example, if the squirrel in the story above is not being targeted, a new storyline about a chipmunk could be introduced to replace the squirrel. Additionally, analytics optimization of the media content can be applied in improving engagement. For example, A/B testing can be performed through streamed targetable objects A media content player system of a preferred embodiment can include a media content item with a plurality of targetable objects renderable on a computing device. The system functions to enable and facilitate the above method and can be configured to perform any suitable various or suitable processes as described above. The system preferably includes at least two navigational operational modes: an object-locked mode and an unlocked mode, which augment the system as described above. The system and method are preferably applied in new emerging media formats to enable a user to be given a limited amount of freedom to explore, but where the user is gently and naturally brought back to one or more set of story lines. The use of the media content item of the system and method may not be strictly linear as traditional media, and can support more immersive interactions with multiple branching, parallel, and side storylines.

The present disclosure presents navigation techniques tailored to these new, limited-interactive, media content items. As a user navigates his viewpoint within the media-content item, the user will preferably see a "targetable" object (though he may not be aware that the object is targetable). This may be an object that is of particular importance to the story line of the content item. For example, the targetable object may be a character in the story or a thing that a character is interacting with. If the user navigates to keep the targetable object in view for a while (generally a few seconds), then the system recognizes the interest of the user in this object and takes over or augments navigational control. The system automatically promotes tracking of the targetable object as it moves in order to keep the object within the user's view. This makes it easier for the user to follow the object. When the user is no longer interested in tracking this object, he tries to navigate away from it, and the system returns full navigational control back to the user.

The system is preferably operable on a computing device and more preferably on a personal computing device with an integrated display. The media content item may have been downloaded across the Internet from a media-content server 106. In some situations, target locking information (i.e., information about the user interactions with the media-content item) is reported from the computing device to a media-content server. The media content server preferably hosts and manages collective media-content item data. The media content item is preferably distributed and played on multiple different computing devices, and may be viewed/experienced by an individual user multiple times. The media content server may perform several functions relating to the collective information. Two functions already mentioned are media-content download and report reception. In a real-world implementation, these and other functions of the media-content server may all be performed on one device or may be spread across several (e.g., in a distributed computing environment/cloud environment).

Figure 10:
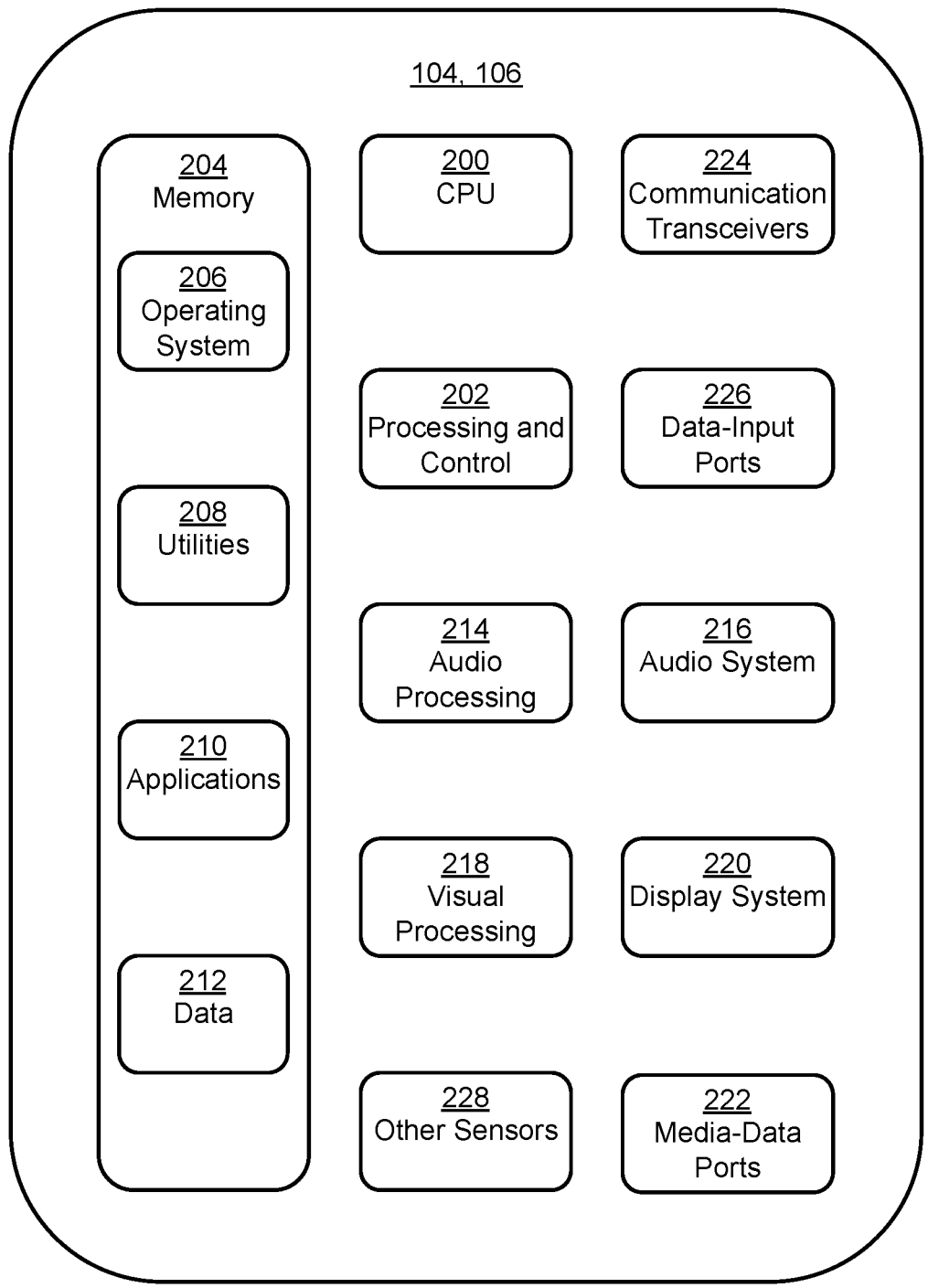
FIG. 10 is a schematic representation of a computing device of a preferred embodiment.

FIG. 10 shows the major components of a representative electronic computing device 104, 106. A portable communications device 104 could be, for example, a smartphone, tablet, personal computer, electronic book, or gaming controller. The server 106 could be any of these and could also be a set-top box, a compute server, or a coordinated group of computes servers.

The CPU 200 of the electronics device 104, 106 includes one or more processors (i.e., any of microprocessors, controllers, and the like) or a processor and memory system, which processes computer-executable instructions to control the operation of the device 104, 106. In particular, the CPU 200 supports aspects of the present disclosure discussed below. The device 104, 106 can be implemented with a combination of software, hardware, firmware, and fixed-logic circuitry implemented in connection with processing and control circuits, generally identified at 202. Although not shown, the device 104, 106 can include a system bus or data-transfer system that couples the various components within the device 104, 106. A system bus can include any combination of different bus structures, such as a memory bus or memory controller, a peripheral bus, a universal serial bus, and a processor or local bus that utilizes any of a variety of bus architectures.

The electronics device 104, 106 also includes one or more memory devices 204 that enable data storage, examples of which include random-access memory, non-volatile memory (e.g., read-only memory, flash memory, EPROM, and EEPROM), and a disk storage device. A disk storage device may be implemented as any type of magnetic or optical storage device, such as a hard disk drive, a recordable or rewriteable disc, any type of a digital versatile disc, and the like. The device 104, 106 may also include a mass-storage media device.

The memory system 204 provides data-storage mechanisms to store device data 212, other types of information and data, and various device applications 210. An operating system 206 can be maintained as software instructions within the memory 204 and executed by the CPU 200. The device applications 210 may also include a device manager, such as any form of a control application or software application. The utilities 208 may include a signal-processing and control module, code that is native to a particular component of the electronics device 104, 106, a hardware-abstraction layer for a particular component, and so on.

The computing device 104, 106 can also include an audio-processing system 214 that processes audio data and controls an audio system 216 (which may include, for example, speakers). A visual-processing system 218 processes graphics commands and visual data and controls a display system 220 that can include, for example, a display screen. The audio system 216 and the display system 220 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 222. In some implementations, the audio system 216 and the display system 220 are components external to the device 104, 106. Alternatively (e.g., in a cellular telephone), these systems 216, 220 are integrated components of the device 104, 106.

The computing device 104, 106 can include a communications interface, which includes communication transceivers 224 that enable wired or wireless communication. Example transceivers 224 include Wireless Personal Area Network radios compliant with various IEEE 802.15 standards, Wireless Local Area Network radios compliant with any of the various IEEE 802.11 standards, Wireless Wide Area Network cellular radios, Wireless Metropolitan Area Network radios compliant with various IEEE 802.16 standards, and wired Local Area Network Ethernet transceivers.

The computing device 104, 106 may also include one or more data-input ports 226 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 226 may include USB ports, coaxial-cable ports, and other serial or parallel connectors (including internal connectors) for flash memory, storage disks, and the like. These data-input ports 226 may be used to couple the device 104, 106 to components, peripherals, or accessories such as microphones and cameras.

Finally, the computing device 104, 106 may include any number of "other sensors" 228. Preferably the computing device 104, 106 includes an inertial measurement unit (IMU). These sensors 228 can include, for example, accelerometers, gyroscopes, magnetometers, tilt sensors, visual or spatial sensing units, GPS, positional sensors, or any suitable sensor.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the media content player system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

The invention claimed is:

1. A method for providing navigable media content on a computing device comprising:
   rendering a targetable object within the navigable media content;
   rendering a field of view within the navigable media content, the field of view comprising a portion of the navigable media content;
   receiving, through a user input mechanism, a first navigation command;
   navigating the field of view within the navigable media content based, at least in part, on the first navigation command;
   entering, by the targetable object, an object-locked mode based, at least in part, on the targetable object being in the field of view;
   rendering, in the object-locked mode, a first storyline of the targetable object and automatically navigating the field of view within the navigable media content to substantially track the targetable object while in the object-locked mode, the first storyline of the targetable object proceeding when the targetable object is in the object-locked mode, the first storyline comprising a first series of events to be performed by the targetable object;
   detecting an unlocking condition based, at least in part, on receiving a second navigation command, the unlocking condition configured to cause the targetable object to exit the object-locked mode; and
   rendering, after exiting the object-locked mode, a second storyline for the targetable object, the second storyline comprising a second series of events performed by the targetable object that are different than the first series of events that were to be performed by the targetable object.

2. The method of claim 1, wherein rendering the second storyline comprises rendering a pause in, or a paused version of, the first storyline.

3. The method of claim 1, wherein rendering the second storyline comprises stopping all movement of the targetable object.

4. The method of claim 1, wherein:
   the first series of events to be performed by the targetable object correspond to a first event timeline of the targetable object; and
   the second series of events performed by the targetable object correspond to a second event timeline of the targetable object.

5. The method of claim 4, wherein the first event timeline and the second event timeline of the targetable object are asynchronous.

6. The method of claim 1, wherein the second navigation command is detected through the user input mechanism.

7. The method of claim 1, wherein the second navigation command is detected through a second user input mechanism.

8. The method of claim 1, wherein receiving the first navigation command or the second navigation command comprises receiving an orientation input through an inertial measurement unit of the computing device.

9. The method of claim 1, wherein the navigable media content is a three-dimensional computer-rendered environment or includes two-dimensional graphics mapped to a spherical, navigable environment.

10. The method of claim 1, wherein the targetable object is capable of triggering the object-locked mode and includes characters, props, environments, or other elements rendered in the field of view, and wherein the first storyline comprises events and narrative elements revolving around the targetable object.

11. The method of claim 1, further comprising rendering a non-targetable object, wherein the non-targetable object includes elements of the field of view that are animated, dynamic, or partially interactive but cannot trigger the object-locked mode.

12. A system comprising:
    a user input mechanism;
    a display;
    one or more computer processors; and
    one or more computer-readable storage media having instructions stored thereon that, responsive to execution by the one or more computer processors, perform operations comprising:
      rendering a targetable object within the navigable media content on the display;
      rendering a field of view within the navigable media content on the display, the field of view comprising a portion of the navigable media content;
      receiving, through the user input mechanism, a first navigation command;
      navigating the field of view within the navigable media content on the display based, at least in part, on the first navigation command;
      entering, by the targetable object, an object-locked mode based, at least in part, on the targetable object being in the field of view;

rendering, in the object-locked mode, a first storyline of the targetable object and automatically navigating the field of view within the navigable media content to substantially track the targetable object while in the object-locked mode, the first storyline of the targetable object proceeding when the targetable object is in the object-locked mode, the first storyline comprising a first series of events to be performed by the targetable object;

detecting an unlocking condition based, at least in part, on receiving a second navigation command, the unlocking condition configured to cause the targetable object to exit the object-locked mode; and rendering, after exiting the object-locked mode, a second storyline for the targetable object, the second storyline comprising a second series of events performed by the targetable object that are different than the first series of events that were to be performed by the targetable object.

13. The system of claim 12, wherein:

the first series of events to be performed by the targetable object correspond to a first event timeline of the targetable object; and the second series of events performed by the targetable object correspond to a second event timeline of the targetable object.

14. The system of claim 13, wherein the first event timeline and the second event timeline of the targetable object.

15. The system of claim 12, wherein the second navigation command is detected through the user input mechanism or through a second user input mechanism.

16. The system of claim 12, wherein receiving the first navigation command or the second navigation command comprises receiving an orientation input through an inertial measurement unit of the system.

17. The system of claim 12, wherein the operations further comprise:

entering, by another targetable object, the object-locked mode based, at least in part, on the second targetable object being in the field of view and the targetable object exiting the object-locked mode.

18. The system of claim 12, further comprising streaming the navigable media content of the first storyline of the targetable object to the display in real time or downloading all or a portion of the navigable media content prior to rendering the navigable media content on the display.

19. The system of claim 12, wherein receiving the first navigation command or the second navigation command is based on collective data associated with tracking information of multiple users.

20. The system of claim 12, further comprising transmitting target locking information corresponding to entering, by the targetable object, the target-locked mode to a remote server to enable the remote server to collect the target locking information into analytics from multiple instances of the navigable media content and further comprising updating a representation of the targetable object or the first storyline of the targetable object based on the analytics.

* * * * *